United States Patent
Kato et al.

(10) Patent No.: US 11,267,510 B2
(45) Date of Patent: Mar. 8, 2022

(54) POSITION SENSOR, POSITION DETECTING SYSTEM AND STEERING SYSTEM USING THE SAME

(71) Applicant: TDK Corporation, Tokyo (JP)

(72) Inventors: Tatsuya Kato, Tokyo (JP); Takahiro Moriya, Tokyo (JP); Toshio Ishikawara, Tokyo (JP); Toshihiko Oyama, Tokyo (JP); Toshinao Kido, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 17/159,555

(22) Filed: Jan. 27, 2021

(65) Prior Publication Data

US 2021/0269093 A1 Sep. 2, 2021

(30) Foreign Application Priority Data

Feb. 28, 2020 (JP) .............................. JP2020-033436

(51) Int. Cl.
*B62D 15/02* (2006.01)
*G01D 5/16* (2006.01)
*G01D 5/14* (2006.01)

(52) U.S. Cl.
CPC ......... *B62D 15/0225* (2013.01); *G01D 5/142* (2013.01); *G01D 5/16* (2013.01)

(58) Field of Classification Search
CPC ....... B62D 15/0225; G01D 5/142; G01D 5/16
See application file for complete search history.

(56) References Cited

U.S. PATENT DOCUMENTS

| | | | | |
|---|---|---|---|---|
| 2011/0025322 | A1* | 2/2011 | Yamazaki | G01R 33/091 324/252 |
| 2016/0178403 | A1* | 6/2016 | Bilger | G01D 5/24461 324/207.21 |
| 2017/0282959 | A1* | 10/2017 | Schlanzke | E05B 47/0696 |
| 2018/0231618 | A1* | 8/2018 | Ohta | G01R 33/0035 |

FOREIGN PATENT DOCUMENTS

JP 2011-137796 A 7/2011

* cited by examiner

*Primary Examiner* — Alvaro E Fortich
(74) *Attorney, Agent, or Firm* — Posz Law Group, PLC (57) ABSTRACT

A position sensor is provided that can detect a position along a long stroke and that can limit an increase in size.

A magnetic sensor has a first magnetic field detecting element that is positioned in a first track; a first processor 4A that outputs voltage VM1 when intensity of a first magnetic field that is applied to the first magnetic field detecting element is equal to or larger than a threshold and that outputs predetermined high voltage VH when the intensity of the first magnetic field is less than the threshold, wherein the voltage VM1 is voltage between predetermined low voltage VL and the high voltage VH and indicates positions of the magnets relative to the first magnetic field detecting element; a second magnetic field detecting element that is positioned in a second track; and a second processor 4B that outputs the low voltage VL when intensity of a second magnetic field that is applied to the second magnetic field detecting element is less than the threshold and that outputs voltage VM2 when the intensity of the second magnetic field is equal to or larger than the threshold, wherein the voltage VM2 is voltage between the low voltage VL and the high voltage VH and indicates positions of the magnets relative to the second magnetic field detecting element.

25 Claims, 7 Drawing Sheets

| | Reference example | Comparative example | Example |
|---|---|---|---|
| Outline |  |  |  |
| Stroke [mm] | 24 | 200 | |
| No. of tracks | 1 | 1 | 2 |
| No. of magnat | 3 | 3 | 4 |
| Distance between magnet - magnet sensor [mm] | 3 | 25 | 12 |
| Distance between centers of magnets D[mm] | | 100 | 56 |
| Dimension of magnet (X direction)[mm] | 6.5 | 40 | 28 |
| Dimension of magnet (Y direction)[mm] | 5 | 13 | 5 |
| Dimension of magnet (Z direction)[mm] | 4 | 15 | 7 |
| Volume of magnet (per one magnet)[mm3] | 130 | 7800 | 980 |
| Total volume of magnets [mm3] | 390 | 23400 | 3920 |
| Ratio of magnet volume | 0.017 | 1 | 0.17 |
| No. of magnetid field detectign element | 1 | 1 | 2 |

POSITION SENSOR, POSITION DETECTING SYSTEM AND STEERING SYSTEM USING THE SAME

BACKGROUND OF THE INVENTION

1. Field of the Invention

The present application is based on, and claims priority from, JP2020-33436, filed on Feb. 28, 2020, the disclosure of which is hereby incorporated by reference herein in its entirety.

The present invention relates to a position sensor that uses a magnetic sensor, as well as a position detecting system using the same and a steering system using the same.

2. Description of the Related Art

A position sensor that uses a magnetic sensor is known. A position sensor has a plurality of magnets that are arranged in series in a movable member, and a magnetic sensor that is arranged in an immobile member. When the movable member is moved, the magnets are moved relative to the magnetic sensor. The magnetic sensor detects a change of a magnetic field that is caused by the relative movement, and thereby detects the positions of the magnets, that is, the position of the movable member. JP2011-137796 discloses a position sensor having four or five magnets that are arranged in series.

SUMMARY OF THE INVENTION

In the position sensor disclosed in JP2011-137796, a plurality of magnets is arranged in series. Accordingly, if the range or stroke of detecting positions is long, the size of the magnets is increased in order to obtain the required intensity of a magnetic field, and the gap between the magnets and the magnetic sensor is also increased. As a result, the size of the position sensor is increased.

The present invention aims at providing a position sensor that can detect a position along a long stroke and that can limit an increase in size.

According to one aspect of the present invention, a position sensor comprises: a magnetic sensor; a plurality of magnets that are moved in a first direction relative to the magnetic sensor, wherein one or some of the magnets are arranged in a first track and remaining magnets are arranged in a second track. The magnetic sensor includes: a first magnetic field detecting element that is positioned in the first track; a first processor that outputs voltage VM1 when intensity of a first magnetic field that is applied to the first magnetic field detecting element is equal to or larger than a threshold and that outputs predetermined high voltage VH when the intensity of the first magnetic field is less than the threshold, wherein the voltage VM1 is voltage between predetermined low voltage VL and the high voltage VH and indicates positions of the magnets relative to the first magnetic field detecting element; a second magnetic field detecting element that is positioned in the second track; and a second processor that outputs the low voltage VL when intensity of a second magnetic field that is applied to the second magnetic field detecting element is less than the threshold and that outputs voltage VM2 when the intensity of the second magnetic field is equal to or larger than the threshold, wherein the voltage VM2 is voltage between the low voltage VL and the high voltage VH and indicates positions of the magnets relative to the second magnetic field detecting element.

According to another aspect of the present invention, a position sensor comprises: a magnetic sensor; a plurality of magnets that are moved in a first direction relative to the magnetic sensor, wherein one or some of the magnets are arranged in a first track and remaining magnets are arranged in a second track. The magnetic sensor includes: a first magnetic field detecting element that is positioned in the first track; a first processor that outputs voltage VM1 when a rotation angle of a first magnetic field that is applied to the first magnetic field detecting element is less than a first threshold and that outputs predetermined high voltage VH when the rotation angle of the first magnetic field is equal to or larger than the first threshold, wherein the voltage VM1 is voltage between predetermined low voltage VL and the high voltage VH and indicates positions of the magnets relative to the first magnetic field detecting element; a second magnetic field detecting element that is positioned in the second track; and a second processor that outputs the low voltage VL when a rotation angle of a second magnetic field that is applied to the second magnetic field detecting element is less than a second threshold and outputs voltage VM2 when the rotation angle of the second magnetic field is equal to or larger than the second threshold, wherein the voltage VM2 is voltage between the low voltage VL and the high voltage VH and indicates positions of the magnets relative to the second magnetic field detecting element.

According to the present invention, it is possible to provide a position sensor that can detect a position along a long stroke and that can limit an increase in size.

The above and other objects, features and advantages of the present invention will become apparent from the following description with reference to the accompanying drawings which illustrate examples of the present invention.

DETAILED DESCRIPTION OF THE INVENTION

With reference to the drawings, embodiments of the present invention will be described. In the following descriptions, the first direction is a direction in which the magnetic sensor and the magnet are moved relative to each other, and is also referred to as the X direction. The second direction is a direction perpendicular to the first direction in a plane where a plurality of magnets is provided (on substrate 5), and is also referred to as the Y direction. A direction that is perpendicular both to the first direction and to the second direction is referred to as the Z direction. A stroke means the moving distance of the magnet relative to the magnetic sensor in the first direction. The present invention is preferably applied, in particular, to a long stroke position sensor.

Figure 1:
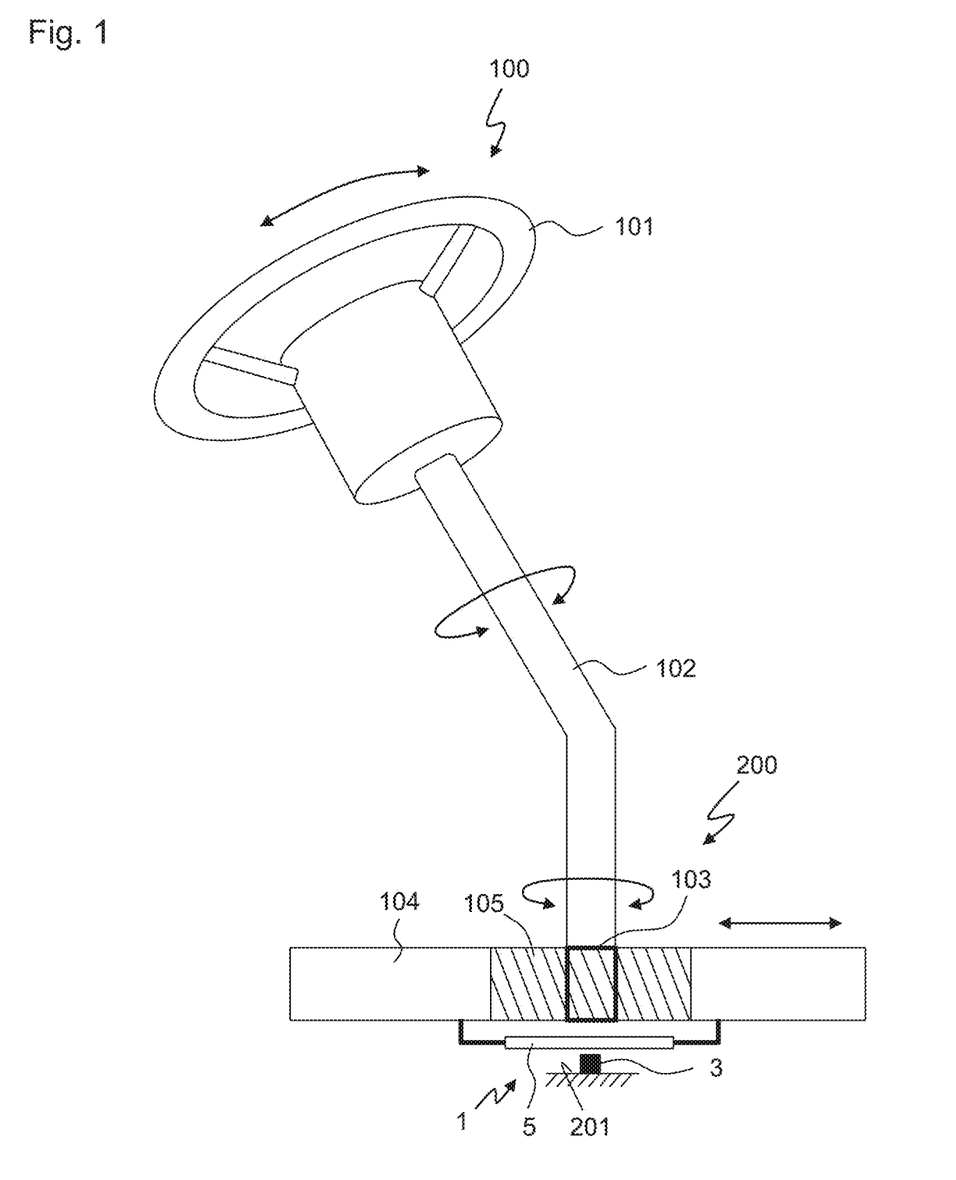
FIG. 1 is a schematic view showing the arrangement of a steering system of a vehicle.

FIG. 1 schematically shows the arrangement of steering system 100 of a vehicle to which the present invention can be preferably applied. In steering system 100, one end of steering shaft 102 is connected to steering wheel 101, and pinion gear 103 is provided on the other end of steering shaft 102. Pinion gear 103 engages rack 105 of rod 104 in order to convert the rotational movement of steering shaft 102 to the linear movement of rod 104 in the lateral direction of the vehicle. Rod 104 is connected to a front wheel (not illustrated). The orientation of the wheel can be changed by the linear movement of rod 104. Position sensor 1 of the present embodiment detects the position of rod 104 in the lateral direction of a vehicle.

Figure 2A:
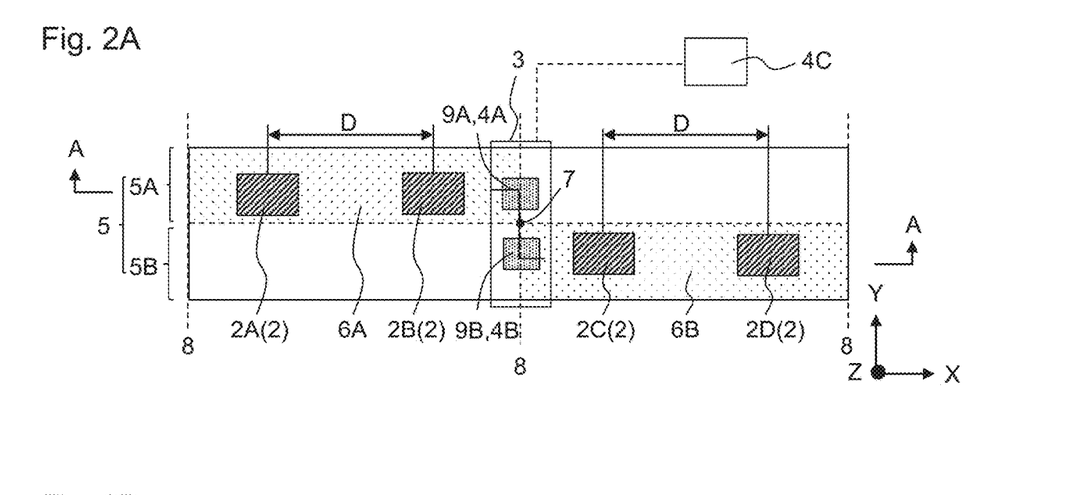
FIGS. 2A to 2B are views generally showing the arrangement of a position sensor according to an embodiment of the present invention.
Figure 2B:
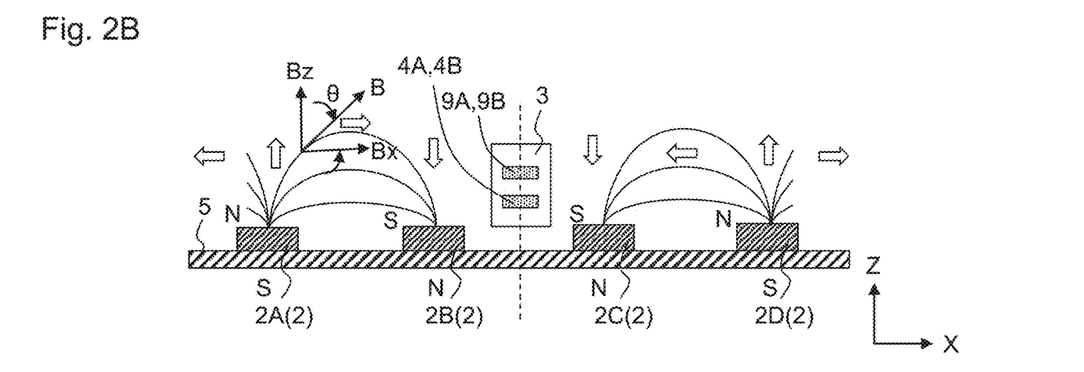

FIG. 2A generally shows the arrangement of position sensor 1, and FIG. 2B shows a section view taken along line A-A in FIG. 2A. In the drawing, the white arrows conceptually show the direction of magnetic flux. Position sensor 1 has a plurality of magnets 2, magnetic sensor 3 and sensor output processor 4C that processes the output of magnetic sensor 3. Magnets 2 are moved in first direction X relative to magnetic sensor 3. Sensor output processor 4C may be realized by a microcomputer or an on-board computer. Magnets 2 are arranged on rod 104, that is a movable member, while magnetic sensor 3 and sensor output processor 4C are arranged on vehicle body 201, that is an immobile member. Position sensor 1, the movable member on which magnets 2 is arranged, and the immobile member on which magnetic sensor 3 is arranged constitute position detecting system 200. It is also possible to arrange magnets 2 on vehicle body 201 and to arrange magnetic sensor 3 on rod 104, but in order to prevent a cable that is connected to magnetic sensor 3 from swinging, magnetic sensor 3 is preferably arranged on an immobile member. The term "arrange" includes directly fixing or connecting an object by means of a bolt or an adhesive, as well as indirectly fixing or connecting an object via another member. In the latter, the movement of magnets 2 and the movement of the movable member may or may not completely coincide. In other words, it is not necessary for magnets 2 and the movable member to travel the same distance or to move along the same path. It is enough for magnets 2 and the movable member to move together such that the movement of magnets 2 corresponds to the movement of the movable member and vice versa. Alternatively, magnets 2 may be provided at one side of a movable member with regard to the moving direction such that only when magnets 2 are moved in one direction, the position is detected by a movable member pushing magnets 2. For convenience, it is assumed in the following descriptions that magnetic sensor 3 is moved relative to magnets 2.

Magnets 2 are arranged on single substrate 5. Magnets 2 may be provided on different substrates individually or in a group, but positional deviation between magnets 2 can be limited by arranging magnets 2 on single substrate 5. Substrate 5 is divided into first track 5A and second track 5B that are adjacent to each other in second direction Y. One or some of magnets 2 are positioned on first track 5A, and the other are positioned on second track 5B. First track 5A and second track 5B are substantially rectangular or strip-shaped regions having the same width in second direction Y. A set of magnets that consists of magnets 2A, 2B is provided on first track 5, and a set of magnets that consists of third and fourth magnets 2C, 2D is provided on second track 5B. First and second magnets 2A, 2B are positioned on a line on first track 5A that is parallel to first direction X. Third and fourth magnets 2C, 2D are positioned on a line on second track 5B that is parallel to first direction X. The back surfaces of the surfaces of first magnet 2A and second magnet 2B that face magnetic sensor 3 may be connected to each other by a yolk (not illustrated) that extends in first direction X. Similarly, the back surfaces of the surfaces of third magnet 2C and fourth magnet 2D that face magnetic sensor 3 may be connected to each other by a yolk (not illustrated) that extends in first direction X. The region of first track 5A where first and second magnets 2A, 2B are provided is referred to as first magnet region 6A. The region of second track 5B where third and fourth magnets 2C, 2D are provided is referred to as second magnet region 6B. That is, one or some of magnets 2 are arranged both in first magnet region 6A and in second magnet region 6. First magnet region 6A corresponds to the left half of first track 5A, and second magnet region 6B corresponds to the right half of second track 5B. First magnet region 6A and second magnet region 6B have the same length in first direction X. The magnet regions of the tracks (first magnet region 6A and second magnet region 6B) are provided exclusively with regard to first direction X, and the magnet region of each track (first magnet region 6A and second magnet region 6B) is provided continuously with the magnet region of the other track (second magnet region 6B and first magnet region 6A). Specifically, first magnet region 6A and second magnet region 6B do not overlap in first direction X (or, as viewed in second direction Y), and no gap is provided between first magnet region 6A and second magnet region 6B. In the region where magnets 2 are arranged, only first magnet region 6A or only second magnet region 6B is allotted at any position in first direction X.

First to fourth magnets 2A to 2D have the same configuration and magnetic properties. The surfaces of first magnet 2A and second magnet 2B that face magnetic sensor 3 have opposite polarities, and the N pole of first magnet 2A and the S pole of second magnet 2B face magnetic sensor 3. The surfaces of third magnet 2C and fourth magnet 2D that face magnetic sensor 3 also have opposite polarities, and the S pole of third magnet 2C and the N pole of fourth magnet 2D face magnetic sensor 3. That is, two adjacent magnets (second magnet 2B and third magnet 2C) are arranged in adjacent magnet regions (first magnet region 6A and second magnet region 6B), respectively, and the surfaces of the two adjacent magnets that face magnetic sensor 3 have the same polarity. As shown in FIG. 2B, since the magnetic flux that is released from first magnet 2A is mainly sucked by second magnet 2B, and the magnetic flux that is released from fourth magnet 2D is mainly sucked by third magnet 2C, magnetic interference between second magnet 2B and third magnet 2C can be limited. Alternatively, the S pole of first magnet 2A and the N pole of second magnet 2B may face magnetic sensor 3, and the N pole of third magnet 2C and the S pole of fourth magnet 2D may face magnetic sensor.

The set of first and second magnets 2A, 2B and the set of third and fourth magnets 2C, 2D are arranged in rotational symmetry with regard to point of contact 7 of first magnet region 6A and second magnet region 6B. Since the distribution and the intensity of the magnetic field are about the same in first magnet region 6A and in second magnet region 6B, the magnetic field detection accuracy can be enhanced. First to fourth magnets 2A to 2D are spaced from edges 8 of first and second magnet regions 6A, 6B in first direction X. If the magnets are arranged on edges 8, due to the increase in the distance between the magnets, larger magnets are required in order to assure the intensity of the magnetic field. In the present embodiment, the lengths of first magnet region 6A and second magnet region 6B in the X direction are about 100 mm (that is, the stroke of position sensor 1 is about 200 mm), and distance D in the X direction between the centers of two magnets in the same magnet region is about 56 mm.

In the present embodiment, two magnets are provided in each track 5A, 5B, but only one magnet may be provided in each track 5A, 5B. As a result, the size of position sensor 1 can be reduced. Alternatively, three magnets may be provided in each track 5A, 5B. As a result, the length of each magnet region in first direction X is increased and the stroke of position sensor 1 can be increased.

Magnetic sensor 3 has magnetic field detecting elements 9A and 9B for tracks 5A and 5B, respectively. Magnetic sensor 3 has first magnetic field detecting element 9A that relates to or that faces first track 5A and second magnetic field detecting element 9B that relates to or that faces second track 5B. First magnetic field detecting element 9A and second magnetic field detecting element 9B are arranged on a line that is parallel to second direction Y. Since first magnetic field detecting element 9A and second magnetic field detecting element 9B are integrated in one package, mutual positional deviation can be limited. First magnetic field detecting element 9A and second magnetic field detecting element 9B each includes an X direction magnetic field detecting element (not illustrated) that senses a magnetic field in the X direction and a Z direction magnetic field detecting element (not illustrated) that senses a magnetic field in the Z direction. The X direction magnetic field detecting element and the Z direction magnetic field detecting element are Hall elements, but may be magnetic field detecting elements of a different type, such as a TMR element.

Magnetic sensor 3 further includes first processor 4A that outputs a predetermined voltage based on the angle of the magnetic field that is detected by first magnetic field detecting element 9A and second processor 4B that outputs a predetermined voltage based on the angle of the magnetic field that is detected by second magnetic field detecting element 9B. Angle $\theta$ of the magnetic field refers to the angle of the magnetic flux in the X-Z plane and can be calculated as arctan (Bz/Bx), where Bx is the intensity of the magnetic field in the X direction, and Bz is the intensity of the magnetic field in the Z direction. First processor 4A and second processor 4B each calculate angle $\theta$ of the magnetic field, and output voltage that is proportional to angle $\theta$ of the magnetic field. The outputted voltage may be determined such that it is proportional to the intensity of the magnetic field Bz in the Z direction.

When magnetic sensor 3 is positioned at the left part of tracks 5A, 5B, first magnetic field detecting element 9A overlaps with first magnet region 6A, as viewed in the Z direction. Since angle $\theta$ of the magnetic field changes when magnetic sensor 3 moves, magnetic sensor 3 can detect its position relative to magnets 2. Similarly, when magnetic sensor 3 is positioned at the right part of tracks 5A, 5B, second magnetic field detecting element 9B overlaps with second magnet region 6B, as viewed in the Z direction. Since angle $\theta$ of the magnetic field changes when magnetic sensor 3 moves, magnetic sensor 3 can detect its position relative to magnets 2. On the other hand, when first magnetic field detecting element 9A overlaps with first magnet region 6A, second magnetic field detecting element 9B is positioned away from second magnet region 6B, and the intensity of the magnetic field that is detected is weak and unstable. Similarly, when second magnetic field detecting element 9B overlaps with second magnet region 6, first magnetic field detecting element 9A is positioned away from first magnet region 6A, and the intensity of the magnetic field that is detected is weak and unstable. A magnetic field that is applied from a magnet that is away from a magnetic field detecting element can be a noise for the magnetic field detecting element. Accordingly, if the output of first magnetic field detecting element 9A and the output of second magnetic field detecting element 9B are simply added together, it will be difficult to obtain the measurement accuracy of position sensor 1. In the present embodiment, the output of first magnetic field detecting element 9A and the output of second magnetic field detecting element 9B are processed in the following manner.

Figure 3A:
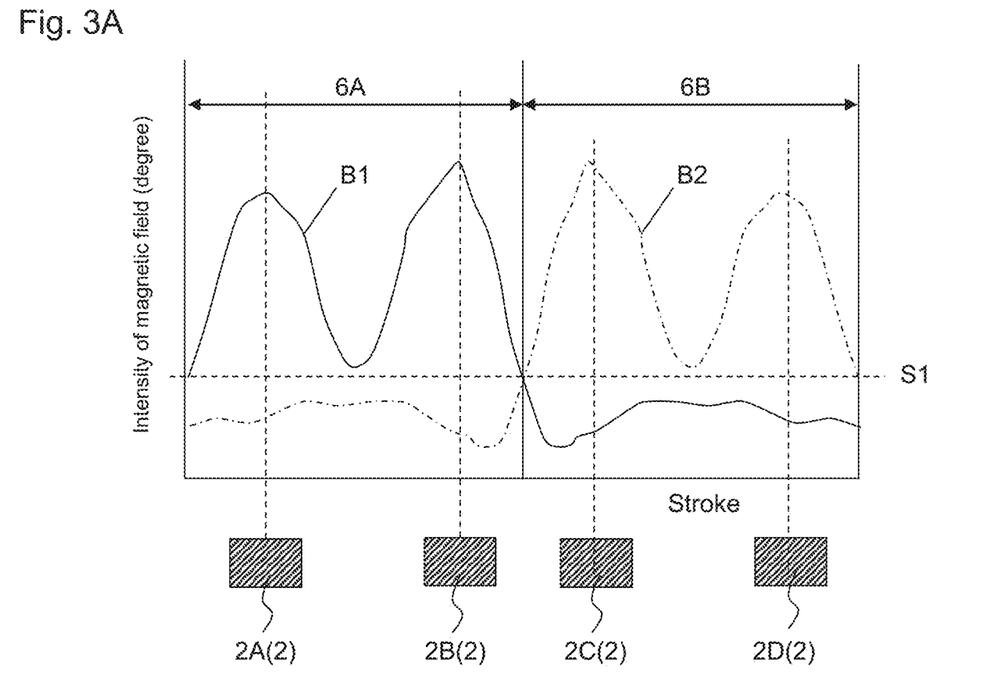
FIGS. 3A to 3B are conceptual views illustrating the operation principle of the position sensor shown in FIGS. 2A to 2B.

Regardless of the position of magnetic sensor 3, first magnetic field detecting element 9A and second magnetic field detecting element 9B detect the intensity of the magnetic field Bx in the X direction and the intensity of the magnetic field Bz in the Z direction, and send them to first processor 4A and second processor 4B, respectively. First processor 4A calculates first intensity B1 of the magnetic field, which is a vector sum of the intensity of the magnetic field Bx and the intensity of the magnetic field Bz that are detected by first magnetic field detecting element 9A. Similarly, second processor 4B calculates second intensity B2 of the magnetic field, which is a vector sum of the intensity of the magnetic field Bx and the intensity of the magnetic field Bz that are detected by second magnetic field detecting element 9B. FIG. 3A shows the relationship among first intensity B1 of the magnetic field, second intensity B2 of the magnetic field and the stroke. First intensity B1 of the magnetic field is strong in first magnet region 6A and is weak in second magnet region 6B. Second intensity B2 of the magnetic field is weak in first magnet region 6A and is large strong in second magnet region 6B.

Figure 3B:
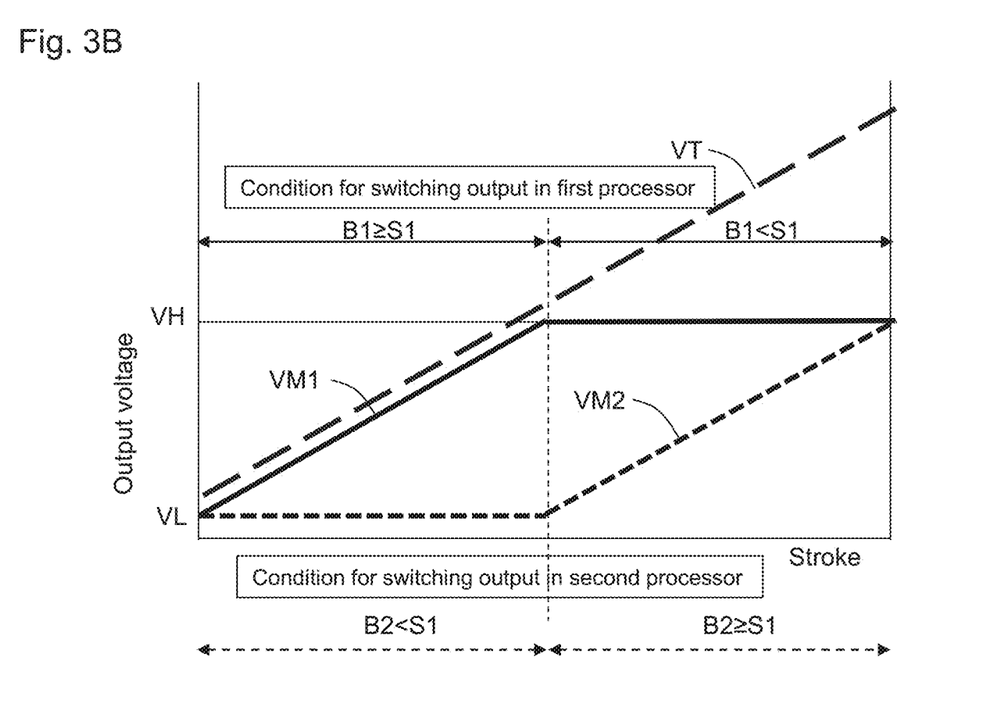

FIG. 3B shows a method of determining the outputs of first and second processors 4A, 4B. When first intensity B1 of the magnetic field is equal to or larger than predetermined threshold S1, first processor 4A outputs first voltage VM1, that is a value between predetermined low voltage VL and predetermined high voltage VH, to sensor output processor 4C depending on angle $\theta$ of the magnetic field (=arctan (Bz/Bx)). Since the relationship between angle $\theta$ of the magnetic field and the position of first magnetic field detecting element 9A in the X direction is determined in advance, first processor 4A outputs first voltage VM1, that corresponds to the position of first magnetic field detecting element 9A in the X direction, to sensor output processor 4C based on angle $\theta$ of the magnetic field. When first intensity B1 of the magnetic field is less than threshold S1, first processor 4A outputs high voltage VH. When first intensity B1 of the magnetic field is less than threshold S1, magnetic sensor 3 is positioned in second magnet region 6B, and the intensity of the magnetic field that is detected by first magnetic field detecting element 9A is weak and unstable. Therefore, the output of first processor 4A is fixed at constant output VH.

On the other hand, when second intensity B2 of the magnetic field is less than threshold S1, second processor 4B outputs low voltage VL. Low voltage VL is voltage that is slightly larger than zero, but the value is not limited. When second intensity B2 of the magnetic field is less than threshold S1, magnetic sensor 3 is positioned in first magnet region 6A, and the intensity of the magnetic field that is detected by second magnetic field detecting element 9B is weak and unstable. Therefore, the output of second processor 4B is fixed at constant output VL. When second intensity B2 of the magnetic field is equal to or larger than threshold S1, second processor 4B outputs second voltage VM2, that is a value between predetermined low voltage VL and predetermined high voltage VH, to sensor output processor 4C depending on angle θ of the magnetic field. As described above, the relationship between angle θ of the magnetic field and the position of second magnetic field detecting element 9B in the X direction is determined in advance, second processor 4B outputs voltage VM2, that corresponds to the position of second magnetic field detecting element 9B in the X direction, to sensor output processor 4C based on angle θ of the magnetic field.

Sensor output processor 4C adds together the voltage that is outputted from first processor 4A and the voltage that is outputted from second processor 4B, and calculates and outputs voltage VT. When first processor 4A outputs first voltage VM1 and second processor 4B outputs low voltage VL, VT=VM1+VL. When first processor 4A outputs voltage VH and second processor 4B outputs second voltage VM2, VT=VH+VM2. The relationship between the position of magnets 2 relative to magnetic sensor 3 in first direction X and voltage VT is determined in advance. Therefore, the relative position can be detected from voltage VT that is outputted from sensor output processor 4C. This process can be performed, for example, by another computer that is mounted on a vehicle. The timing when first processor 4A switches the voltage from/to first voltage VM1 to/from high voltage VH and the timing when second processor 4B switches the voltage from/to low voltage VL to/from second voltage VM2 preferably coincides, but there may be some time lag.

Figure 4A:
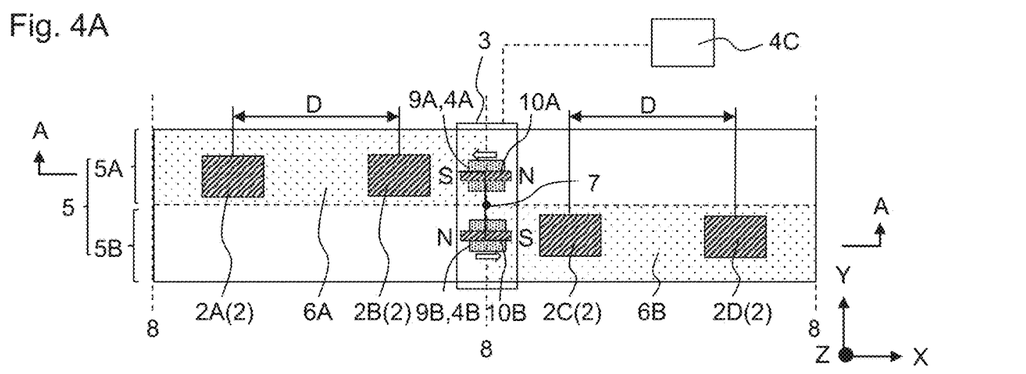
FIGS. 4A to 4B are views generally showing the arrangement of a position sensor according to another embodiment of the present invention.
Figure 4B:
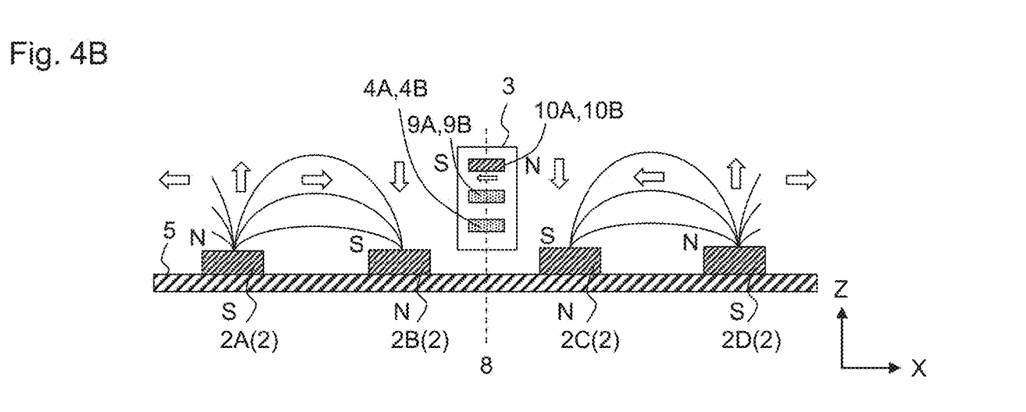

FIGS. 4A, 4B show another method of processing the output of first magnetic field detecting element 9A and the output of second magnetic field detecting element 9B. First bias magnet 10A is provided near first magnetic field detecting element 9A, and second bias magnet 10B is provided near second magnetic field detecting element 9B. The N pole of first bias magnet 10A is positioned on the back side of (on the right side of) first magnet region 6A and the S pole faces (is positioned on the left side of) first magnet region 6A. The N pole of second bias magnet 10B is positioned on the back side of (on the left side of) second magnet region 6B, and the S pole faces (is positioned on the right side of) second magnet region 6B. As a result, a leftward magnetic flux is generated near first bias magnet 10A, and a rightward magnetic flux is generated near second bias magnet 10B. First magnetic field detecting element 9A detects Bx and Bz, and first processor 4A calculates first angle θ1 of the magnetic field (=arctan (Bz/Bx)). Similarly, second magnetic field detecting element 9B detects Bx and Bz, and second processor 4B calculates second angle θ2 of the magnetic field (=arctan (Bz/Bx)).

Figure 5A:
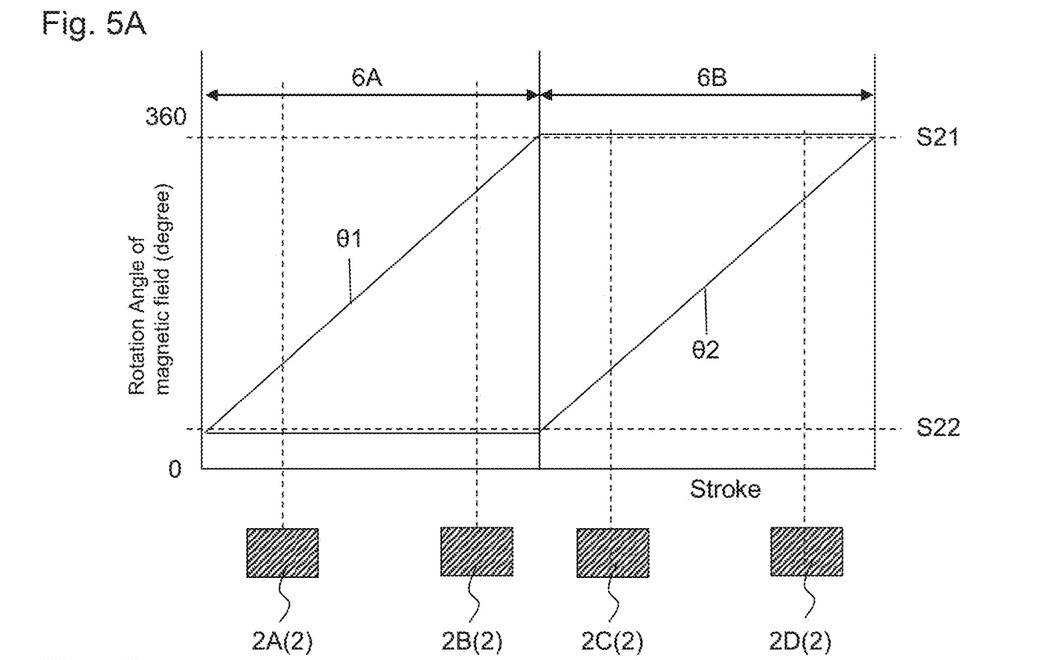
FIGS. 5A to 5B are conceptual views illustrating the operation principle of the position sensor shown in FIGS. 4A to 4B.

FIG. 5A shows the relationship between first and second angles θ1, θ2 of the magnetic field and the stroke. The bias magnetic field of first bias magnet 10A and second bias magnet 10B is weaker than the magnetic field of first to fourth magnets 2A to 2D. In first magnet region 6A, the magnetic flux is directed generally leftward at the left edge, generally upward near first magnet 2A and rotates clockwise toward the right side. In the region between the left edge of first magnet region 6A and the vicinity of second magnet 2B, the magnetic field of first and second magnets 2A, 2B dominates, while the magnetic field of first bias magnet 10A is negligible, as compared to the former. On the other hand, in the region between second magnet 2B and third magnet 2C, the magnetic field of first bias magnet 10A dominates due to the weak and unstable magnetic field. As a result, first angle θ1 of the magnetic field makes about one rotation between the left edge and the right edge of first magnet region 6A. On the right of this region, that is, in the region adjacent to second magnet region 6B in the Y direction, first angle θ1 of the magnetic field is substantially kept at a constant value by the bias magnetic field of first bias magnet 10A. On the other hand, in the region adjacent to first magnet region 6A in the Y direction, second angle θ2 of the magnetic field is substantially kept at a constant value by the bias magnetic field of second bias magnet 10B, and on the right of this region, that is, in second magnet region 6B, second angle θ2 of the magnetic field makes about one rotation between the left edge and the right edge of second magnet region 6B.

Figure 5B:
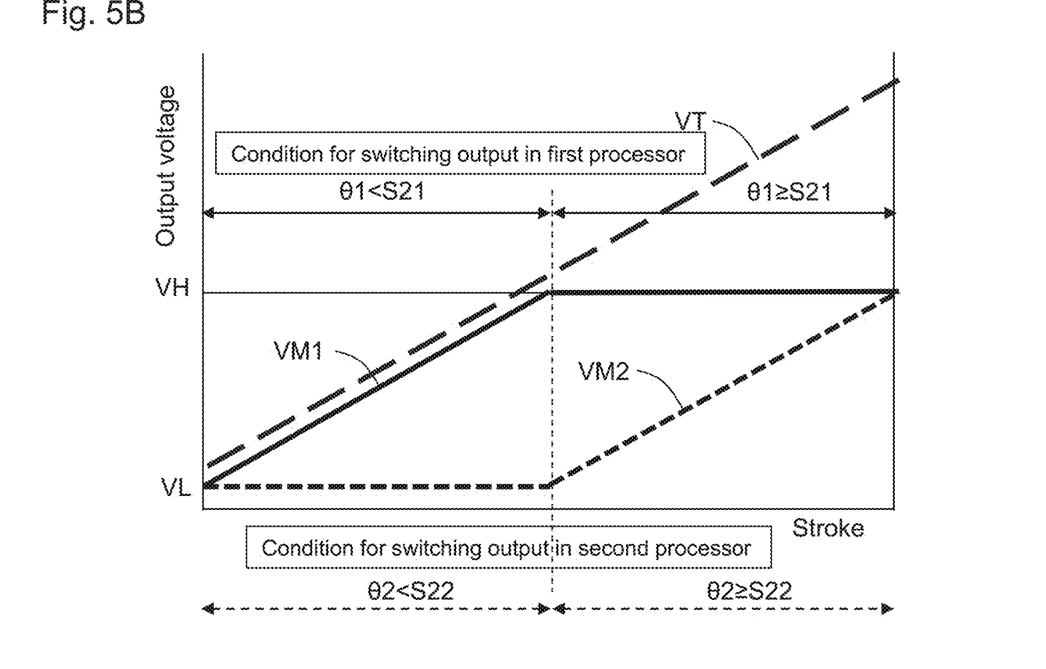

FIG. 5B shows a method of determining the outputs of first and second processors 4A, 4B. When first angle θ1 of the magnetic field is less than predetermined first threshold S21, first processor 4A outputs first voltage VM1, that is a value between predetermined low voltage VL and predetermined high voltage VH, to sensor output processor 4C depending on first angle θ1 of the magnetic field. Since the relationship between first angle θ1 of the magnetic field and the position of first magnetic field detecting element 9A in the X direction is determined in advance, first processor 4A outputs first voltage VM1, that corresponds to the position of first magnetic field detecting element 9A in the X direction, to sensor output processor 4C based on first angle θ1 of the magnetic field. When first angle θ1 of the magnetic field is equal to or larger than first threshold S21, first processor 4A outputs high voltage VH. When first angle θ1 of the magnetic field is equal to or larger than first threshold S21, magnetic sensor 3 is positioned in second magnet region 6B, and the intensity of the magnetic field that is detected by first magnetic field detecting element 9A is weak and unstable. Therefore, the output of first processor 4A is fixed at constant output VH.

When second angle θ2 of the magnetic field is less than predetermined second threshold S22, second processor 4B outputs low voltage VL. When second angle θ2 of the magnetic field is less than second threshold S22, magnetic sensor 3 is positioned in first magnet region 6A, and the intensity of the magnetic field that is detected by second magnetic field detecting element 9B is weak and unstable. Therefore, the output of second processor 4B is fixed at constant output VL. When second angle θ2 of the magnetic field is equal to or larger than second threshold S22, second processor 4B outputs second voltage VM2, that is a value between predetermined low voltage VL and predetermined high voltage VH, to sensor output processor 4C depending on second angle θ2 of the magnetic field. As described above, since the relationship between second angle θ2 of the magnetic field and the position of second magnetic field detecting element 9B in the X direction is determined in advance, second processor 4B outputs voltage VM2, that corresponds to the position of second magnetic field detecting element 9B in the X direction, to sensor output processor 4C based on second angle θ2 of the magnetic field.

Sensor output processor 4C adds together the voltage that is outputted from first processor 4A and the voltage that is outputted from second processor 4B in order to calculate voltage VT. When first processor 4A outputs first voltage VM1 and second processor 4B outputs low voltage VL, VT=VM1+VL. When first processor 4A outputs voltage VH and second processor 4B outputs second voltage VM2, VT=VH+VM2. The relationship between the position of magnets 2 relative to magnetic sensor 3 in first direction X and voltage VT is determined in advance. Therefore, the relative position can be detected from voltage VT that is outputted from sensor output processor 4C. The timing when first processor 4A switches the voltage from/to first voltage VM1 to/from high voltage VH and the timing when second processor 4B switches the voltage from/to low voltage VL to/from second voltage VM2 preferably coincides, but there may be some time lag. It is desirable in this embodiment that each track have a sufficient width in the Y direction in order to mitigate the influence of the magnets in the adjacent track, but shield 11, that will be described later in the third modification, may be provided alternatively.

The present invention has been described by the embodiments, but the present invention is not limited to the above-described embodiments. Some modifications of the present invention will now be described.

Figure 6A:
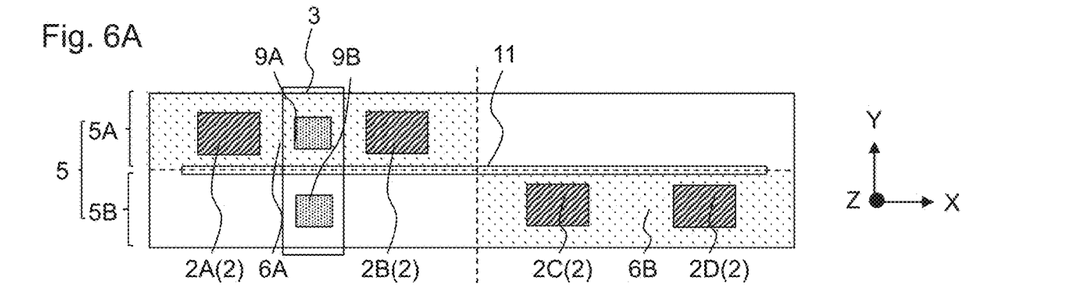
FIGS. 6A to 6B are schematic view of a first modification of the present invention.
Figure 6B:
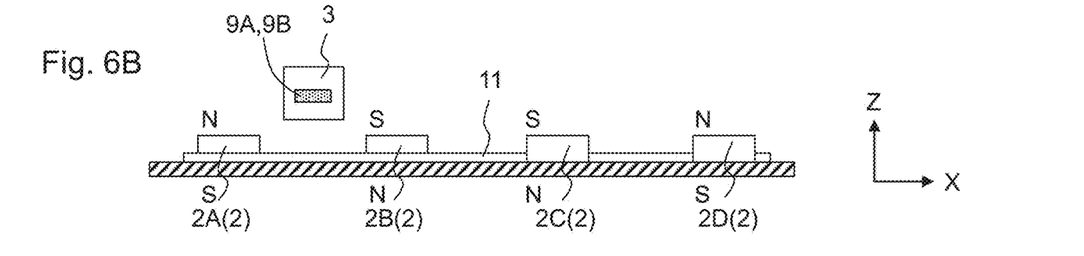

FIGS. 6A, 6B are views similar to FIGS. 2A, 2B showing the first modification of the present invention. This modification includes shield 11 that extends in first direction X between first track 5A and second track 5B that are adjacent to each other. Shield 11 is preferably made of a soft magnetic material, such as iron, ferrosilicon and perm-alloy. As described above, first magnetic field detecting element 9A detects a magnetic field that is generated by first magnet 2A and second magnet 2B, but at the same time, detects a magnetic field that is generated by third magnet 2C and fourth magnet 2D. Especially when magnetic sensor 3 is positioned near third magnet 2C, first magnetic field detecting element 9A is further affected by the magnetic field that is generated by third magnet 2C and fourth magnet 2D. Due to shield 11 that blocks the magnetic field, it is possible to reduce the widths (the dimension in second direction Y) of first track 5A and second track 5B and thereby to reduce the size of position sensor 1.

Figure 7A:
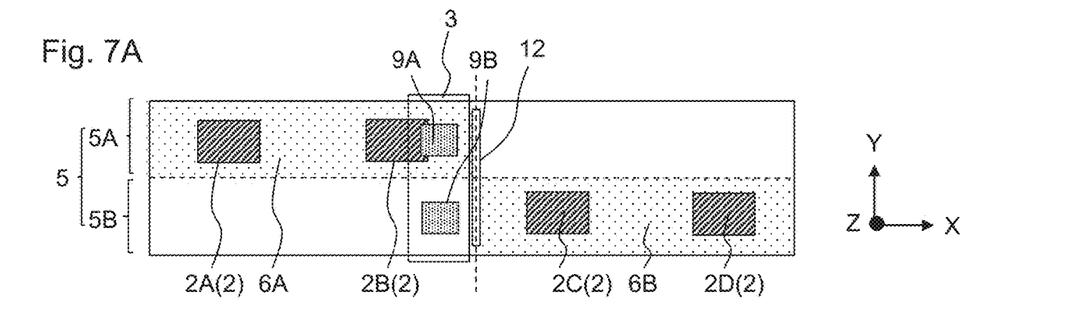
FIGS. 7A to 7B are schematic view of a second modification of the present invention.
Figure 7B:
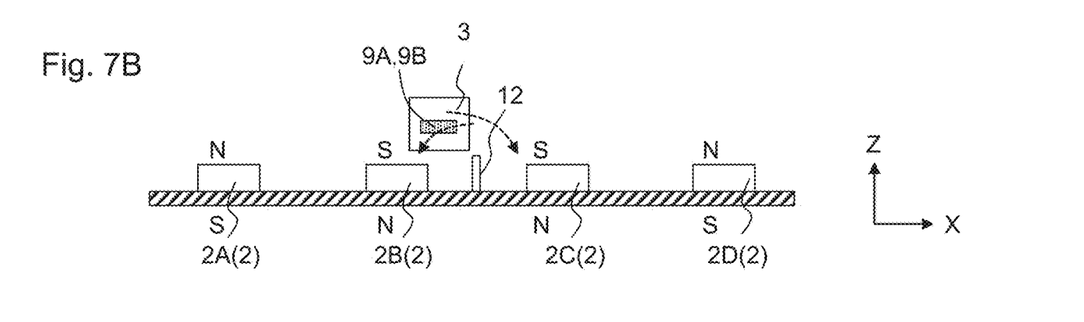

FIGS. 7A, 7B are views similar to FIGS. 2A, 2B showing the second modification of the present invention. This modification includes shield 12 that is positioned between first magnet region 6A and second magnet region 6B that are adjacent to each other. Shield 12 extends in second direction Y across first track 5A and second track 5B that are adjacent to each other. In the same manner as shield 11, shield 12 is preferably made of a soft magnetic material, such as iron, ferrosilicon and perm-alloy. When magnetic sensor 3 is positioned in first magnet region 6A between second magnet 2B and third magnet 2C, as illustrated, first magnetic field detecting element 9A may detect a magnetic field that is generated by third magnet 2C. Although the magnetic field is weak between second magnet 2B and third magnet 2C, a leftward magnetic flux is generated on the right of second magnet 2B, and a rightward magnetic flux is generated on the left of third magnet 2C. As a result, the magnetic flux that is sucked by second magnet 2B is weakened, and the measurement accuracy may be affected. Shield 12 blocks a magnetic field that is generated by third magnet 2C, and reduces the influence of third magnet 2C on first magnetic field detecting element 9A. Similarly, shield 12 blocks a magnetic field that is generated by second magnet 2B, and reduces the influence of second magnet 2B on second magnetic field detecting element 9B.

According to the third modification of the present invention, sensor output processor 4C may selectively output, as voltage VT, either voltage VM1 that is outputted from first processor 4A or voltage VM2 that is outputted from second processor 4B. When first processor 4A outputs first voltage VM1 and second processor 4B outputs low voltage VL, VT=VM1. When first processor 4A outputs voltage VH, and second processor 4B outputs second voltage VM2, VT=VM2. The present modification provides the same result as the case where both VL and VH are zero in the above-mentioned embodiment, but it is not necessary to add the outputs together.

Referring to FIGS. 3A, 3B, when second intensity B2 of the magnetic field is less than threshold S1, sensor output processor 4C outputs, as VT, first voltage VM1 that is outputted from first processor 4A instead of the summation of VT=VM1+VL. When first intensity B1 of the magnetic field is less than threshold S1, sensor output processor 4C outputs, as VT, second voltage VM2 that is outputted from second processor 4B instead of summation of VT=VM2+VH. In this case, the position of magnets 2 relative to magnetic sensor 3 cannot be determined by the output voltage of sensor output processor 4C alone. Accordingly, sensor output processor 4C preferably further outputs the information regarding which is selected (as the output of sensor output processor 4C itself) from among the output from first processor 4A and the output from second processor 4B. For example, when the output of first processor 4A is selected as the output of sensor output processor 4C, magnetic sensor 3 will be positioned in first magnet region 6A in FIGS. 3A, 3B. Therefore, the position of magnets 2 can be calculated from the output voltage of sensor output processor 4C. When magnetic sensor 3 is positioned near the boundary between first magnet region 6A and second magnet region 6B, it is possible that both conditions B1<S1 and B2<S1 will be satisfied. In this case, the condition (B1<S1 or B2<S1) which will be prioritized may be determined in advance, and the output may be determined according to the prioritized condition. In the present invention, when both conditions B1<S1 and B2<S1 are satisfied, first processor 4A outputs high voltage VH, and second processor 4B outputs VL. When the condition B1<S1 is prioritized, sensor output processor 4C may select output VH of first processor 4A as the output of sensor output processor 4C. When the condition B2<S1 is prioritized, sensor output processor 4C may select output VL of second processor 4B as the output of sensor output processor 4C. When either condition B1<S1 or B2<S1 is satisfied, the above-described process is performed. That is, the voltage that is outputted from sensor output processor 4C is not limited to VM1 and VM2, and may be the output of first processor 4A or the second processor 4B.

Referring to FIGS. 5A, 5B, when second angle θ2 of the magnetic field is less than second threshold S22, sensor output processor 4C outputs, as VT, first voltage VM1 that is outputted from first processor 4A, instead of the summation of VT=VM1+V. When first angle θ1 of the magnetic field is equal to or larger than first threshold S21, sensor output processor 4C outputs, as VT, second voltage VM2 that is outputted from second processor 4B, instead of the summation of VT=VM2+VH. In this case, as described referring to FIGS. 3A, 3B, sensor output processor 4C preferably further outputs the information regarding which voltage is adopted (as the output of sensor output processor 4C itself) from among the output from first processor 4A and the output from second processor 4B. When magnetic sensor 3 is positioned near the boundary between first magnet region 6A and second magnet region 6B, it is possible that both conditions B1<S1 and B2<S1 will be satisfied. In this case, as described referring to FIGS. 3A, 3B, the condition which will be prioritized may be determined in advance and the output may be determined according to the prioritized condition.

As described above, whether magnetic sensor 3 is positioned in first magnet region 6A or in second magnet region 6B can be determined based on the information regarding which output, from among first processor 4A and second processor 4B, is selected by sensor output processor 4C (as the output of sensor output processor 4C itself). Thus, the position of magnets 2 in first direction X relative to magnetic sensor 3 can be determined from output VT. Since the present modification does not require the summation of the outputs, sensor output processor 4C can be simplified.

Figure 8:
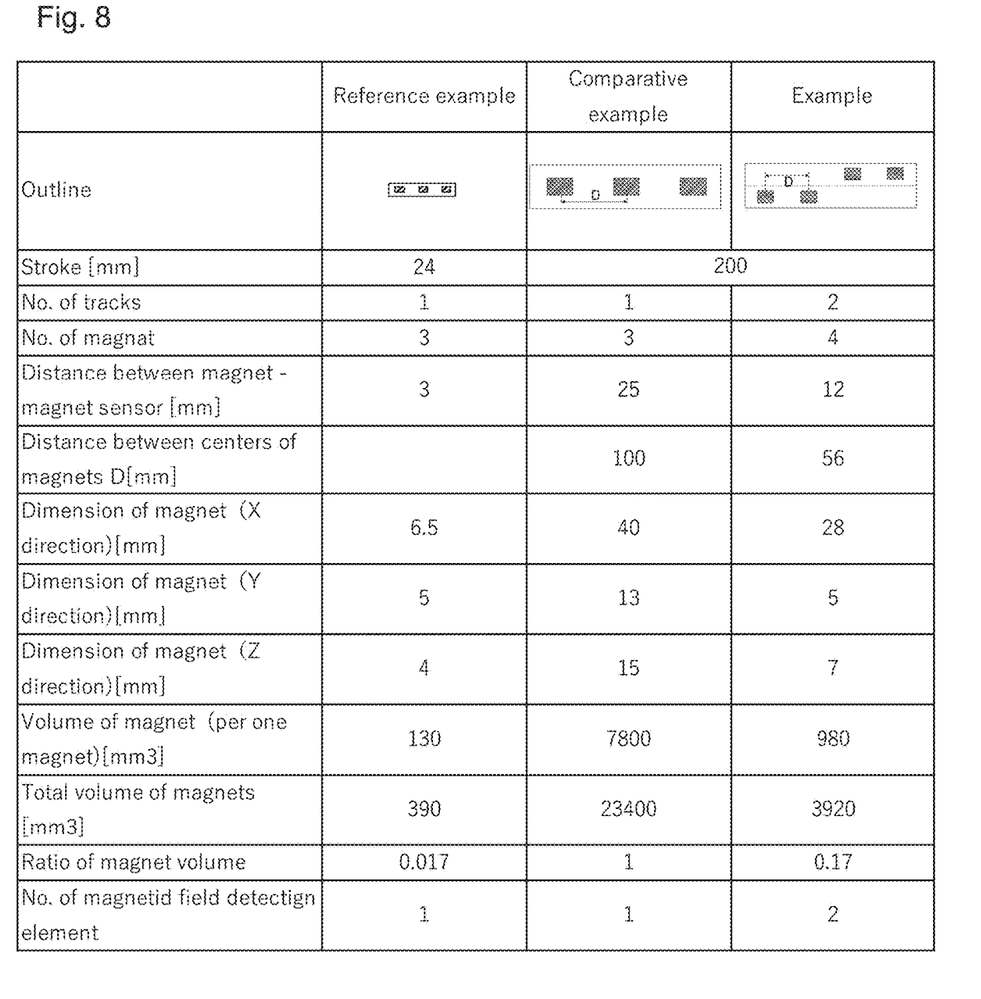
FIG. 8 is a comparison between a reference example, a comparative example and an example of the position sensor.

Lastly, the present embodiment will be compared to a comparative example. FIG. 8 shows comparison among position sensors of a reference example, a comparative example and an example. The reference example is an example of a conventional short stroke position sensor. The number of the track is one, and the stroke is 24 mm. Three magnets are provided at both ends and at the center of the substrate. The comparative example and the example are examples of a long stroke position sensor. The stroke is 200 mm, which is about eight times larger than that of the reference example. The comparative example has a one-track configuration like the reference example, and the number and arrangement of the magnets are also the same as the reference example. Large size magnets are required in order to generate a strong magnetic field for large distance D between the centers of the magnets. The total volume of the magnets is significantly increased, as compared to the increasing stroke rate, and is about 60 times larger than that of the reference example. The height (the dimension the Z direction) of the magnets is about four times larger than that of the reference example. In order to efficiently apply a magnetic field to the magnetic sensor, the distance between the magnets and the magnetic sensor in the Z direction is increased from the reference example at about the same increasing rate as the increasing rate of the stroke. Therefore, the cost of the comparative example is higher than the that of the reference example, and the installation space is significantly increased. In addition, the increase in size of the magnet results in an increase in the magnetic force of the magnet. This creates the possibility that the accuracy for detecting positions is worsened by metal, such as iron powder, easily adhering to the magnet, as well as the possibility that the process of assembling the position sensor into a vehicle is complicated. Furthermore, the surrounding magnetic elements tend to be affected by the magnets of the position sensor.

The example corresponds to the embodiment shown in FIGS. 2A, 2B. Due to the two-track configuration, distance D between the centers of the magnets in the example is about half distance D in the comparative example. Accordingly, it is not necessary to use such large size magnets as used in the comparative example. The number of the magnets is increased, but the total volume of the magnets is less than 20% of that of the comparative example. The distance between the magnets and the magnetic sensor is about half the distance in the comparative example.

Although a certain preferred embodiment of the present invention has been shown and described in detail, it should be understood that various changes and modifications may be made without departing from the spirit or scope of the appended claims.

What is claimed is:
1. A position sensor comprising:
 a magnetic sensor;
 a plurality of magnets that are moved in a first direction relative to the magnetic sensor, wherein one or some of the magnets are arranged in a first track and remaining magnets are arranged in a second track, wherein
 the magnetic sensor includes:
 a first magnetic field detecting element that is positioned in the first track;
 a first processor that outputs voltage VM1 when intensity of a first magnetic field that is applied to the first magnetic field detecting element is equal to or larger than a threshold and that outputs predetermined high voltage VH when the intensity of the first magnetic field is less than the threshold, wherein the voltage VM1 is voltage between predetermined low voltage VL and the high voltage VH and indicates positions of the magnets relative to the first magnetic field detecting element;
 a second magnetic field detecting element that is positioned in the second track; and
 a second processor that outputs the low voltage VL when intensity of a second magnetic field that is applied to the second magnetic field detecting element is less than the threshold and that outputs voltage VM2 when the intensity of the second magnetic field is equal to or larger than the threshold, wherein the voltage VM2 is voltage between the low voltage VL and the high voltage VH and indicates positions of the magnets relative to the second magnetic field detecting element.

2. The position sensor according to claim 1, further comprising a sensor output processor that processes output of the magnetic sensor, wherein the sensor output processor calculates a sum of output of the first processor and output of the second processor.

3. The position sensor according to claim 1, further comprising a sensor output processor that processes output of the magnetic sensor, wherein the sensor output processor outputs output of the first processor as output of the sensor output processor when the intensity of the second magnetic field is less than the threshold and outputs output of the second processor as the output of the sensor output processor when the intensity of first magnetic field is less than the threshold.

4. The position sensor according to claim 1, wherein the first processor calculates the intensity of the first magnetic field based on a magnetic field that is detected by the first magnetic field detecting element, and the second processor calculates the intensity of the second magnetic field based on a magnetic field that is detected by the second magnetic field detecting element.

5. The position sensor according to claim 1, wherein the first processor calculates the voltage VM1 based on the intensity of the first magnetic field, and the second processor calculates the voltage VM2 based on the intensity of the second magnetic field.

6. The position sensor according to claim 1, wherein said one or some of the magnets are arranged in a first magnet region of the first track, and the remaining magnets are arranged in a second magnet region of the second track.

7. The position sensor according to claim 6, wherein the first magnet region and the second magnet region are provided exclusively and continuously in the first direction.

8. The position sensor according to claim 6, wherein surfaces of a pair of adjacent magnets have a same polarity, wherein the surfaces face the magnetic sensor, and one of the pair of magnets is arranged in the first magnet region and the other is arranged in the second magnet region.

9. The position sensor according to claim 6, wherein each magnet is spaced from edges of the first and second magnet regions in the first direction.

10. The position sensor according to claim 6, further comprising a shield that extends between the first magnet region and the second magnet region, wherein the shield extends across the first and the second tracks in a direction perpendicular to the first direction.

11. The position sensor according to claim 1, further comprising a shield that extends in the first direction between the first track and the second track.

12. The position sensor according to claim 6, wherein one magnet is arranged in the first magnet region and in the second magnet region, respectively.

13. The position sensor according to claim 6, wherein two magnets are arranged in the first magnet region and in the second magnet region, respectively.

14. The position sensor according to claim 6, wherein three magnets are arranged in the first magnet region and in the second magnet region, respectively.

15. The position sensor according to claim 6, wherein a set of the magnets that are arranged in the first magnet region and a set of the magnets that are arranged in the second magnet region are provided in rotational symmetry with regard to a point of contact of the first magnet region and the second magnet region.

16. The position sensor according to claim 1, wherein the magnets are arranged on one substrate.

17. A position detecting system comprising:
the position sensor according to claim 1;
a movable member to which the magnets are fixed; and
an immobile member to which the magnetic sensor is fixed.

18. A steering system comprising the position detecting system according to claim 17.

19. A position sensor comprising:
a magnetic sensor;
a plurality of magnets that are moved in a first direction relative to the magnetic sensor, wherein one or some of the magnets are arranged in a first track and remaining magnets are arranged in a second track, wherein
the magnetic sensor includes:
a first magnetic field detecting element that is positioned in the first track;
a first processor that outputs voltage VM1 when a rotation angle of a first magnetic field that is applied to the first magnetic field detecting element is less than a first threshold and that outputs predetermined high voltage VH when the rotation angle of the first magnetic field is equal to or larger than the first threshold, wherein the voltage VM1 is voltage between predetermined low voltage VL and the high voltage VH and indicates positions of the magnets relative to the first magnetic field detecting element;
a second magnetic field detecting element that is positioned in the second track; and
a second processor that outputs the low voltage VL when a rotation angle of a second magnetic field that is applied to the second magnetic field detecting element is less than a second threshold and outputs voltage VM2 when the rotation angle of the second magnetic field is equal to or larger than the second threshold, wherein the voltage VM2 is voltage between the low voltage VL and the high voltage VH and indicates positions of the magnets relative to the second magnetic field detecting element.

20. The position sensor according to claim 19, further comprising a sensor output processor that processes output of the magnetic sensor, wherein the sensor output processor calculates a sum of output of the first processor and output of the second processor.

21. The position sensor according to claim 19, further comprising a sensor output processor that processes output of the magnetic sensor, wherein the sensor output processor outputs output of the first processor as output of the sensor output processor when the rotation angle of the second magnetic field is less than the second threshold and outputs output of the second processor as the output of the sensor output processor when the rotation angle of first magnetic field is less than the first threshold.

22. The position sensor according to claim 19, wherein the first processor calculates the rotation angle of the first magnetic field based on a magnetic field that is detected by the first magnetic field detecting element, and the second processor calculates the rotation angle of the second magnetic field based on a magnetic field that is detected by the second magnetic field detecting element.

23. The position sensor according to claim 19, wherein the first processor calculates the voltage VM1 based on the rotation angle of the first magnetic field, and the second processor calculates the voltage VM2 based on the rotation angle of the second magnetic field.

24. The position sensor according to claim 19, wherein said one or some of the magnets are arranged in a first magnet region of the first track, and the remaining magnets are arranged in a second magnet region of the second track.

25. The position sensor according to claim 24, wherein the magnetic sensor includes:
a first bias magnet that applies a magnetic field to the first magnetic field detecting element, wherein the magnetic field is directed in a direction opposite to a direction of a magnetic field at a center of the first magnet region, and
a second bias magnet that applies a magnetic field to the second magnetic field detecting element, wherein the magnetic field is directed in a direction opposite to a direction of a magnetic field at a center of the second magnet region.

* * * * *